J. P. McLEAN.
PROCESS OF PRESERVING ANIMAL AND VEGETABLE SUBSTANCES.

No. 187,029. Patented Feb. 6, 1877.

UNITED STATES PATENT OFFICE.

JAMES P. McLEAN, OF NEW YORK, N. Y.

IMPROVEMENT IN PROCESSES OF PRESERVING ANIMAL AND VEGETABLE SUBSTANCES.

Specification forming part of Letters Patent No. 187,029, dated February 6, 1877; application filed October 21, 1876.

*To all whom it may concern:*

Be it known that I, JAMES P. McLEAN, of the city, county, and State of New York, have invented a certain novel and useful Process for Preserving Meat, Fish, or Fruit for Shipment to Hot Climates; and I hereby declare the following to be a full, clear, and exact description thereof, reference being had to the accompanying drawings, which are lettered to correspond with, and form a part of, the specification.

Figure 1:
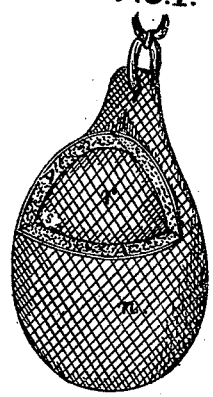
Figure 2:
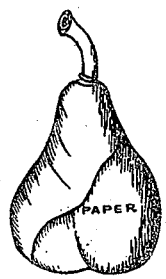
Figure 3:
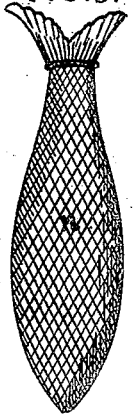

To enable those skilled in the preservation of animal or vegetable matter to prepare and apply the same, I will describe it as follows, to wit:

Figure 1 represents a shoulder of pork, having a section, s, of my carbon and gypsum coating A cut away, in order to show the *modus operandi* of constructing said plastic jacket. Fig. 2 represents a pear provided with a similar coating, without the canvas layers or wrappers r n, Fig. 1. Fig. 3 is a fish similarly coated to Fig. 1.

In order that the public may comprehend the nature of my plastic jacket, and its effect upon animal or vegetable matter, I will here state its chemical properties, and its effect upon decomposing matter.

Wood-charcoal is composed of a superabundance of carbon and a small proportion of oxygen. Gypsum is composed of sulphuric acid and lime. The purifying nature of both these natural products are well known to the chemist and engineer. Charcoal recently prepared has the property of resisting putrefaction in animal and vegetable substances, particularly in animal substance, to such a degree that meat has been known to be rendered sweet after it has once been tainted, and the most stagnant water has been made perfectly pure and sweet by the introduction of common gypsum or plaster-of-paris, or by filtering the same through pulverized charcoal. The carbon commingles with the lime, thus forming a composition destitute of volatility, and, consequently, of smell, which renders, in my opinion, one of the best preparations for preparing meat, fish, or vegetables for long shipments, as well as being a perfect non-conductor of heat or cold.

I will now describe my mode of preparing and applying the same, to wit:

Take, for example, a shoulder or ham of pork, or smoked salmon, wrap it tightly in an open or coarse canvas jacket, r. It is then ready to receive the plastic coating, which is prepared and applied as follows, to wit:

To three parts of common ground gypsum add three parts of pulverized charcoal, with which a suitable quantity of waste textile or vegetable fibers, such as threads of cotton or linen cut in short lengths, or oats, chaff, short hay, &c., may be successfully used to bind the mixture together, when the same is mixed in water to the consistency of thin paste, in a similar manner to the use of hair in mortar for building purposes.

After thoroughly mixing the above compound I apply the same upon the open canvas jacket r, surrounding the ham or fish, with a brush, or by submerging the article to be coated into the mixture itself, until a coating one-eighth of an inch, more or less, is produced over the entire ham or fish. While the coating is in a wet state roll the article in dry gypsum, and then apply the outer jacket n, which finishes the operation, unless it is deemed requisite to apply an additional coating of any vegetable gum, &c., to more fully protect the plaster shell from fracture; or the outer canvas jacket n may be coated with dissolved gutta-percha, in combination with the above compound, if thought best, without injury to the meat or fruit.

It is not necessary to use the canvas jackets r and n in preparing fruit, but simply wrap the plastic-jacketed fruit in paper in lieu of canvas.

After having thus described the mode of preparing my plastic coating, I would here state that a small quantity of chloride of sodium, or common salt, may be mixed with the above compound to a great advantage, particularly in the preservation of meats; and in order to increase the adhesiveness and hardening properties of this plastic coating I would add a small quantity of hydraulic cement mixed with the charcoal.

I do not confine myself to any specific proportions of the above ingredients.

The novelty of my invention consists in the use and manner of preparing and applying the plastic coating A of the above-described disinfecting chemical agents in any suitable proportions, in combination with the wrappers *r* and *n*, for the purpose of preserving animal or vegetable matter for shipment or otherwise.

What I claim as novel and useful, and wish to protect by Letters Patent of the United States, is—

The process of preserving animal or vegetable substances, which consists in coating said substances, provided with a suitable envelope or covering, as described, with a plastic composition, consisting of charcoal, gypsum, fiber, and water, and then rolling the article in dry gypsum, substantially as described.

In testimony whereof I hereunto subscribe my name in the presence of two witnesses.

JAMES P. McLEAN.

Witnesses:
SAML. McCONKEY,
EDWARD J. POWERS.